(12) United States Patent
Kanayama et al.

(10) Patent No.: US 7,032,465 B2
(45) Date of Patent: Apr. 25, 2006

(54) ROTATIONAL ANGLE DETECTING DEVICE FOR A WAVE GEAR DEVICE

(75) Inventors: Naoki Kanayama, Nagano-ken (JP); Masashi Horiuchi, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 80 days.

(21) Appl. No.: 10/827,363

(22) Filed: Apr. 20, 2004

(65) Prior Publication Data

US 2004/0261545 A1 Dec. 30, 2004

(30) Foreign Application Priority Data

May 1, 2003 (JP) ............................. 2003-126437

(51) Int. Cl.
*G01L 1/22* (2006.01)

(52) U.S. Cl. ................................. 73/862.338

(58) Field of Classification Search ............. 73/862.08, 73/862.325, 862.338, 862.191, 862.391, 73/862.381
See application file for complete search history.

(56) References Cited

U.S. PATENT DOCUMENTS 6,840,118 B1 * 1/2005 Godler et al. .......... 73/862.325

FOREIGN PATENT DOCUMENTS

| JP | 10-019554 | * 1/1998 |
| JP | 2004-045378 | 2/2004 |

* cited by examiner

*Primary Examiner*—Max Noori
(74) *Attorney, Agent, or Firm*—Buchanan Ingersoll PC

(57) ABSTRACT

A driving mechanism includes a motor and a wave gear device. Three sets of torque sensors are attached at intervals of 120° on a diaphragm of a flexible external gear of the wave gear device. In the rotational angle detecting part of the signal processing circuit, signal components that are included in the outputs of the torque sensors, that vary in the form of two cycles of a sine wave per rotation of the wave generator and are synchronous with a rotational angle of the wave generator are extracted and a coordinate transformation is carried out for the obtained three-phase sinusoidal signals to calculate two-phase sinusoidal signals that are 90° out of phase, with the rotational angle of the wave generator being calculated based on these signals. Without providing a rotational angle detector separately, it is possible to detect the rotational angle of the wave generator using the outputs of the torque sensors.

6 Claims, 5 Drawing Sheets

CALCULATED VALUES BASED ON EXPERIMENTAL DATA
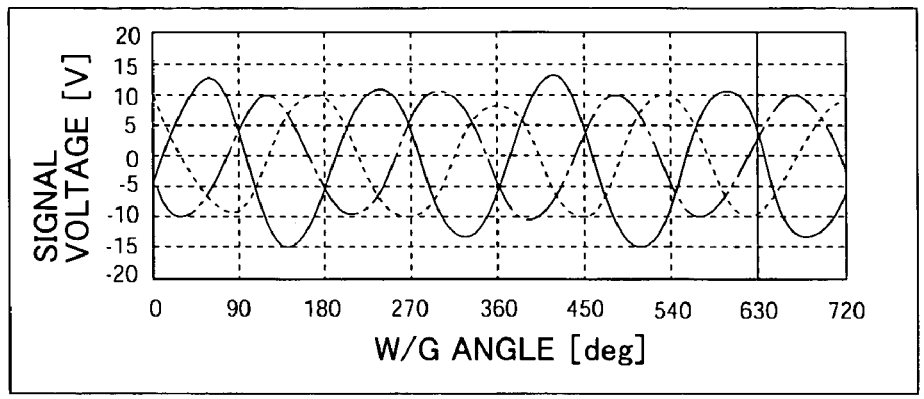
THREE-PHASE SIGNALS OBTAINED FROM STRAIN GAUGES
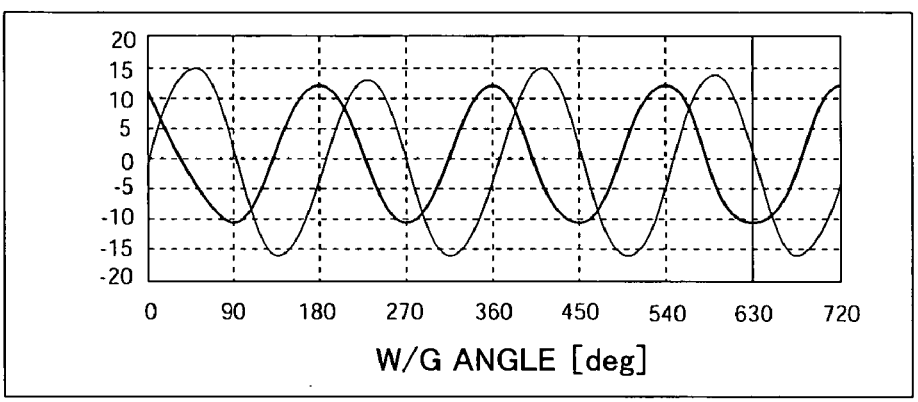
TWO-PHASE SIGNALS OBTAINED
VIA COORDINATE TRANSFORMATION
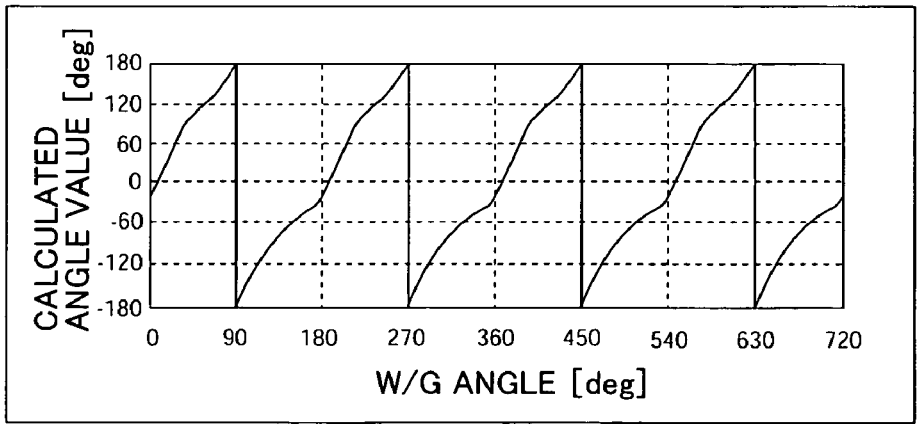
CALCULATED ARCTAN FOR TWO-PHASE SIGNALS

ROTATIONAL ANGLE DETECTING DEVICE FOR A WAVE GEAR DEVICE

BACKGROUND OF THE INVENTION

1. Field of the Invention

The present invention relates to a rotational angle detecting device and detecting method that can detect a rotational angle of a wave generator of a wave gear device based on the output of strain detecting elements attached to the wave gear device.

2. Related Art

A wave gear device usually includes a ring-shaped rigid internal gear, a flexible external gear that is disposed inside the rigid internal gear, and a wave generator that has an oval outline. The flexible external gear is flexed into an elliptical shape by the wave generator, and engages the rigid internal gear at both ends of the major axis of the elliptical shape. As the wave generator is rotated by a motor or the like, the engagement positions of the both gears move in a circumferential direction, and due to a difference in the number of teeth between these gears, a decelerated rotational output is obtained from one of the gears.

A construction where multiple sets of strain gauges are stuck onto a diaphragm of the flexible external gear at intervals of a predetermined angle around a central axis thereof so that an error component due to cyclic displacement of the flexible external gear caused by the wave generator can be eradicated, is known as a torque sensor for a wave gear device. Based on the outputs of these sets of strain gauges, it is possible to eradicate error components (ripples in rotation) due to displacement of the flexible external gear that is not related to the transmission torque, so that the torque can be detected precisely.

Here, the flexible external gear flexed into an elliptical shape is repeatedly displaced in a radial direction at a rate of two cycles per single rotation. Accordingly, an error component that sinusoidally varies in two cycles per single rotation of a wave generator is included in an output of the strain gauge. The applicant of the present application has proposed the use of this error component in the detection of a rotational angle of the flexible external gear or the rigid internal gear that is an output member of a wave gear device in JP-A 10-19554.

The wave gear device is typically used in combination with an AC servo motor or the like to constitute a driving mechanism in an industrial robot, precision machining equipment, or the like. In those driving mechanisms, it is essential to detect the rotational angle of the motor shaft to control the driving of the motor.

SUMMARY OF THE INVENTION

It is an object of the present invention to provide a rotational angle detecting device and method that can detect a rotational angle of a wave generator connected to a motor output shaft based on outputs of strain detecting elements, such as strain gauges, disposed on a wave gear device and does not require an angle detector for the motor shaft.

To achieve the above and other objects, the present invention is directed to a rotational angle detecting device for a wave gear device that includes a ring-shaped rigid internal gear, a flexible external gear, and a wave generator having an elliptical shape that flexes the flexible external gear into an elliptical shape so as to partially engage the rigid internal gear and moves engagement positions of the two gears in a circumferential direction, comprising:

first, second, and third strain detecting elements disposed at intervals of 120° in a circumferential direction on one of the rigid internal gear and the flexible external gear;

a signal component extracting unit that extracts, from outputs of the first to third strain detecting elements, signal components that appear as two cycles of a sine wave per rotation of the wave generator and are synchronous with a rotational angle of the wave generator;

a signal processing unit that generates two-phase sinusoidal signals that are 90° out of phase by carrying out a coordinate transformation on the three-phase sinusoidal signals that are 120° out of phase and have been extracted from the outputs of the first to third strain detecting elements; and an angle calculating unit that calculates a rotational angle of the wave generator based on the two-phase sinusoidal signals.

According to the present invention, it is possible to detect the rotational angle of the wave generator based on the outputs of strain detecting elements. It is therefore possible to detect the rotational angle of a motor shaft of an AC servo motor or the like to which the wave generator is connected. This means that an angle detector for the motor shaft is not required on the motor side, so that a driving mechanism composed of a motor and a wave gear device can be made smaller and more compact, and can be achieved at low cost.

Here, the flexible external gear may include a cylindrical trunk part, a ring-shaped diaphragm that extends from one end of the cylindrical trunk part outward or inward in a radial direction, a thick boss that is continuous with one of an outer circumferential edge or an inner circumferential edge of the diaphragm, and external teeth formed on an outer circumferential surface of the other end portion of the cylindrical trunk part where an opening is formed.

Also, the first to third strain detecting elements may be disposed on the flexible external gear.

In addition, a plurality of strain gauges may be used as the first to third strain detecting elements.

Next, a driving mechanism according to the present invention includes a servo motor, a wave gear device, and an above-mentioned rotational angle detecting device for the wave gear device, wherein a motor shaft of the servo motor is fixed to a wave generator of the wave gear device, and a rotational angle of the motor shaft is detected by the rotational angle detecting device.

On the other hand, according to the present invention, there is provided a rotational angle detecting method of detecting a rotational angle of a wave generator of a wave gear device which has a ring-shaped rigid internal gear, a flexible external gear, and the wave generator with an elliptical shape that flexes he flexible external gear into an elliptical shape so as to partially engage the rigid internal gear and moves engagement positions of the two gears in a circumferential direction, comprising steps of:

disposing first to third strain detecting elements at intervals of 120° in a circumferential direction on one of the rigid internal gear and the flexible external gear;

extracting, from outputs of the first to third strain detecting elements, signal components that appear as two cycles of a sine wave per rotation of the wave generator and are synchronous with a rotational angle of the wave generator;

generating two-phase sinusoidal signals that are 90° out of phase by carrying out a coordinate transformation on three-phase sinusoidal signals that are 120° out of phase and have been extracted from the outputs of the strain detecting elements; and, calculating a rotational angle of the wave generator based on the two-phase sinusoidal signals.

BRIEF DESCRIPTION OF THE DRAWINGS

FIGS. 5A to 5C are graphs showing examples of three-phase sinusoidal signals, two-phase sinusoidal signals, and calculation results for an angle output value found from outputs obtained from torque sensors of the wave gear device of FIG. 1.

DESCRIPTION OF THE PREFERRED EMBODIMENTS

An example of a driving mechanism according to the present invention will be described with reference to the attached drawings.

Figure 1:
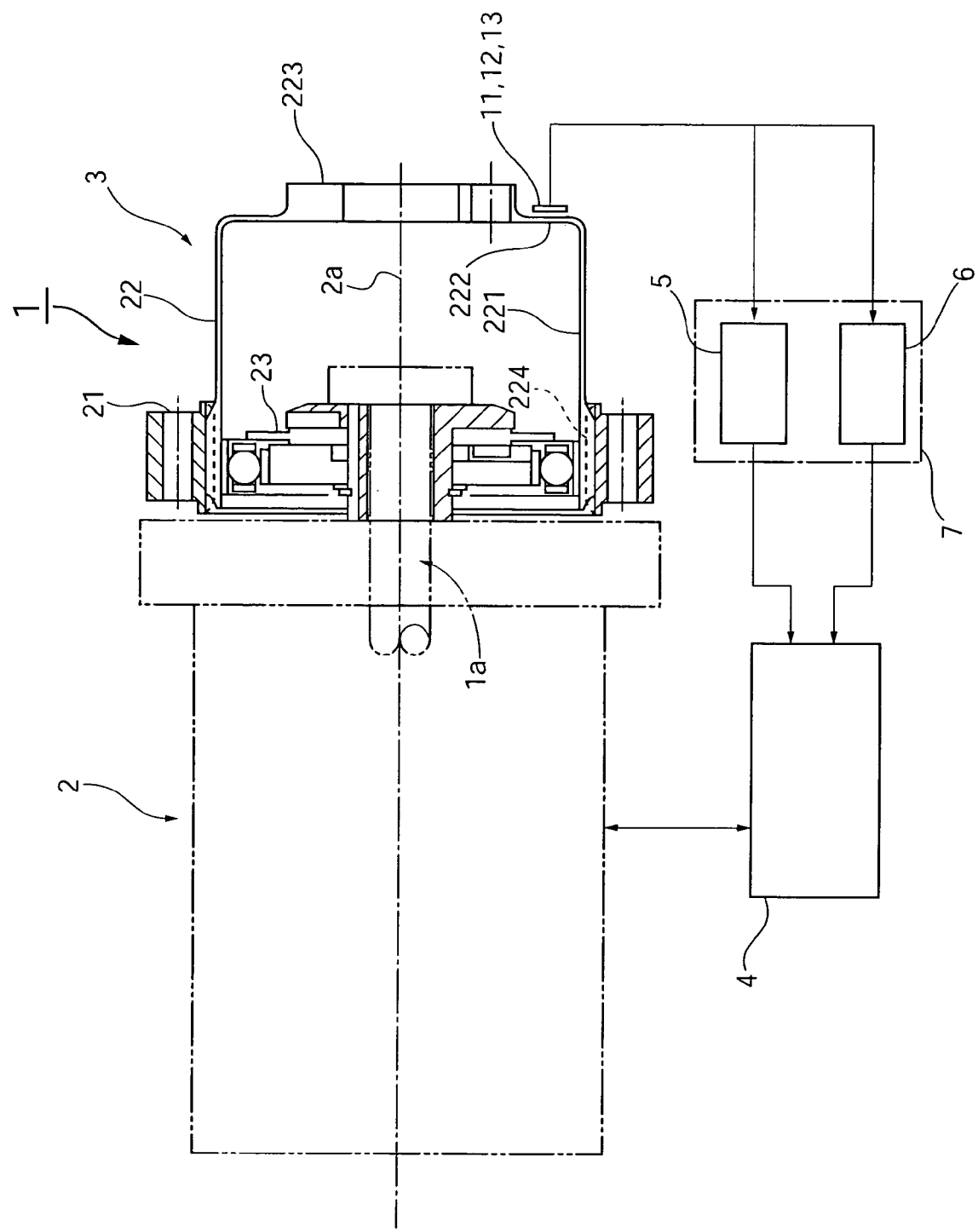
FIG. 1 schematically shows one example of a driving mechanism according to the present invention.

FIG. 1 is an explanatory diagram showing the driving mechanism. The driving mechanism 1 is an example where a torque sensor and an angle detector are integrally assembled.

The driving mechanism 1 includes an AC servo motor 2, a wave gear device 3 serving as a reduction device, and a driving control circuit 4. The driving control circuit 4 receives transmission torque information for the wave gear device 3 and rotational angle information for a wave generator thereof from a signal processing circuit 7 that includes a torque detecting part 5 and a rotational angle detecting part 6. Detection signals from three sets of torque sensors 11 to 13 are inputted into the torque detecting part 5 and the rotational angle detecting part 6. A torque detecting device is constituted by these torque sensors 11 to 13 and the torque detecting part 5. Also, in the present embodiment, the torque sensors 11 to 13 and the rotational angle detecting part 6 constitute a rotational angle detecting device.

The wave gear device 3 has a ring-shaped rigid internal gear 21, a cup-shaped flexible external gear 22, and a wave generator 23 with an elliptical shape. The wave generator 23 is fitted inside the flexible external gear 22 to flex it into an elliptical shape. As a result, the flexible external gear 22 is engaged with the rigid internal gear 21 at both ends of the major axis of the ellipse. The wave generator 23 is fixed to a motor shaft 1a of the AC servo motor 2. As the wave generator 23 rotates, the engagement positions of the gears 21, 22 move in a circumferential direction and due to the difference in the number of teeth between these gears, relative rotation between them is generated. As one example, the rigid internal gear 21 is fixed and the relative rotation of the gears is outputted from the flexible external gear 22 as a reduced-speed rotational output and transmitted to a load side (not shown).

The flexible external gear 22 has a cylindrical trunk part 221, a disc-shaped diaphragm 222 closing one end of the cylindrical trunk part 221, a thick boss 223 formed in a central part of the diaphragm 222, and external teeth 224 formed on an outer circumferential surface part of an opening portion at the other end of the cylindrical trunk part 221.

Figure 2:
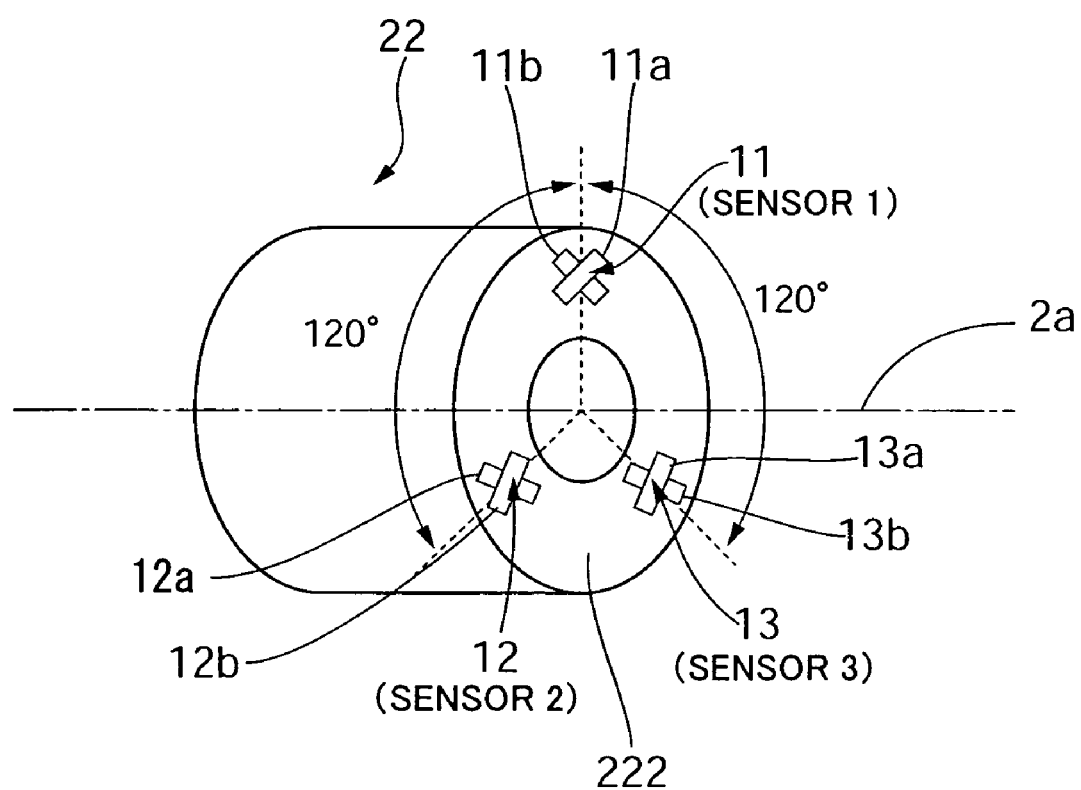
FIG. 2 is an explanatory diagram showing positions of torque sensors attached to a wave generator of the wave gear device of FIG. 1.

FIG. 2 shows the positions of the three sets of torque sensors 11 to 13 stuck to the diaphragm 222 of the flexible external gear 22 of the wave gear device 3. The torque sensors 11 to 13 are disposed at intervals of 120° about a device axis 2a. The respective torque sensors 11 to 13 include two strain gauges (11a, 11b), (12a, 12b), and (13a, 13b) that are stuck onto the diaphragm 222, each pair of the strain gauges disposed so that the strain gauges intersect at 90° with each other. These strain gauges 11a to 13b are connected to form a bridge circuit whose outputs are inputted into the torque detecting part 5 so that the transmission torque via the wave gear device 3 is calculated.

Figure 3:
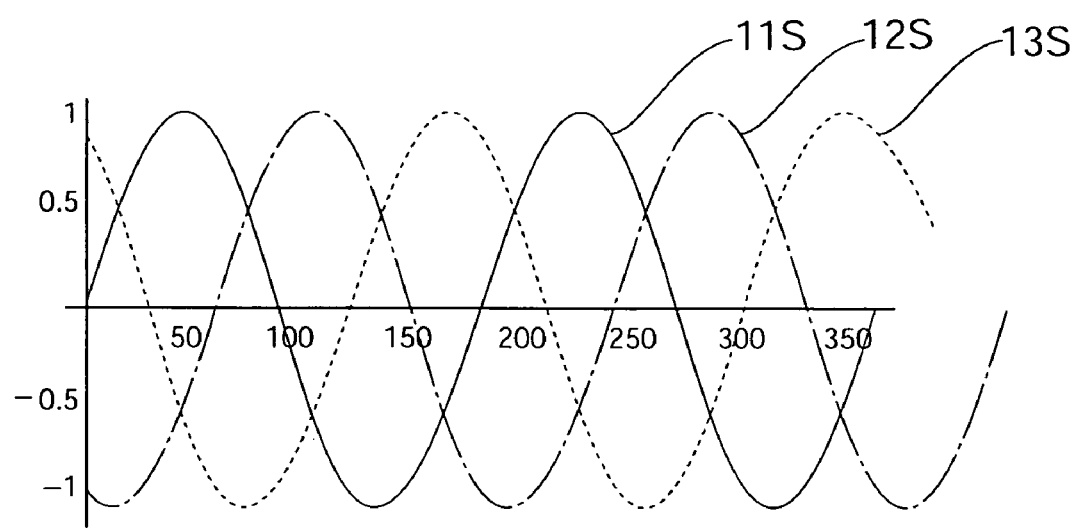
FIG. 3 is a graph showing three-phase sinusoidal signals extracted from the outputs of the torque sensors.
Figure 4:
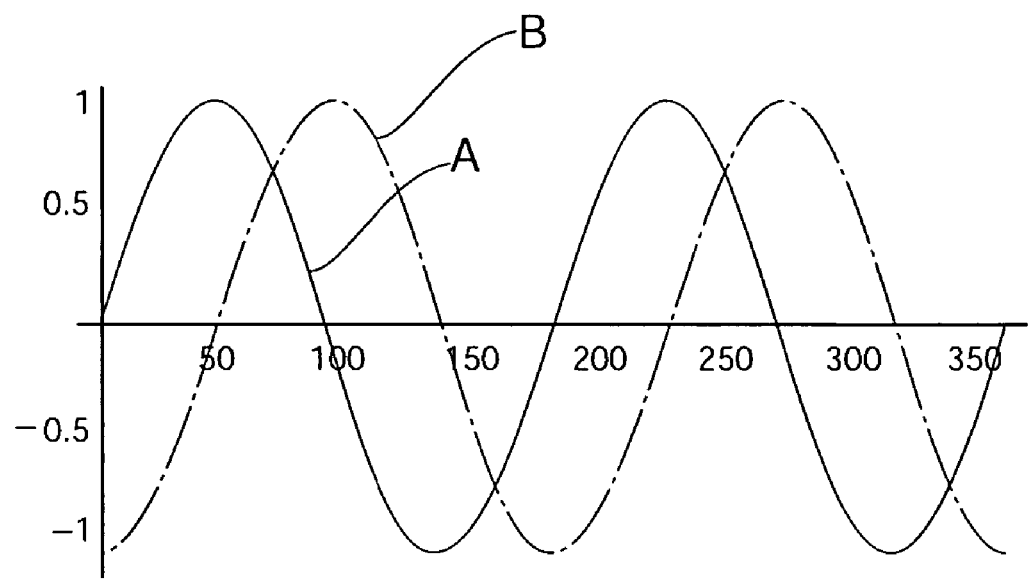
FIG. 4 is a graph showing two-phase sinusoidal signals obtained by carrying out a coordinate transformation on three-phase sinusoidal signals.

On the other hand, the rotational angle detecting part 6 extracts the error components (ripples in rotation), which appears as a two-cycle sine wave per rotation of the wave generator 23, from the outputs of the three sets of torque sensors 11 to 13. In other words, the rotational angle detecting part 6 extracts a signal component in synchronization with the rotational angle of the wave generator 23. As shown in FIG. 3, the error components extracted from the outputs of the respective torque sensors 11 to 13 are obtained as the three-phase sinusoidal signals 11S, 12S, 13S that are 120° out of phase. The horizontal axis of the graph in FIG. 3 shows the rotational angle of the wave generator 23. Next, by carrying out a coordinate transformation on the three-phase sinusoidal signals 11S, 12S, 13S, the rotational angle detecting part 6 generates two-phase sinusoidal signals A and B that are 90° out of phase. These two-phase sinusoidal signals A and B are shown in FIG. 4. By carrying out an arctan calculation based on these two-phase sinusoidal signals A and B that are 90° out of phase, the rotational angle detecting part 6 calculates the rotational angle of the wave generator 23.

Namely, the rotational angle detecting part 6 reads the voltage outputs of the torque sensors 11 to 13 (that is, voltage values of the respective sinusoidal signals 11S to 13S in FIG. 3) at a given instant, generates two values (the values of the respective sinusoidal signals A and B in FIG. 4) from these three values via a coordinate transformation, and carries out an arctan calculation for these values to calculate the rotational angle of the wave generator 23.

In this way, in the driving mechanism 1 of this embodiment, error components included in the output of the torque sensors 11 to 13 of the wave gear device 3 serving as a reduction device, are used in the rotational angle detecting part 6 to detect the rotational angle of the wave generator 23. The wave generator 23 is fixed to the motor shaft 1a, so that the rotational angle of the motor shaft 1a can be detected without separately providing a rotational angle detector for the motor shaft 1a.

FIGS. 5A to 5C show experimental data obtained using the wave gear device 3 as constituted above. FIG. 5A shows the three-phase sinusoidal signals 11S to 13S extracted from the outputs of the respective torque sensors 11 to 13. If these three-phase sinusoidal signals 11S to 13S are plotted in three-dimensional space, a perfect circle is drawn on a plane that is defined by a normal vector passing through the origin and having the coordinates (1,1,1). By carrying out a rotational coordinate transformation twice in a three-dimensional space, it is possible to superpose the plane on which the circle is drawn onto the x-y plane of the spatial coordinates. The necessary rotational transformations are a rotation of −45° about the y-axis and a rotation of arcs in $(1/\sqrt{3})°$ about the x-axis. To adjust the calculated values to the actual values, a rotational transformation about the z-axis is also necessary for alignment with the starting point for data measurement. FIG. 5B shows the two-phase sinusoidal signals A, B obtained through coordinate transformations of the three-phase sinusoidal signals 11S to 13S, with these signals resulting from a rotational conversion of 24.74° about the z-axis.

FIG. 5C is a graph showing calculated angle values obtained by calculating an arctan from the two-phase sinusoidal signals A, B.

OTHER EMBODIMENTS

In the above embodiment, the flexible external gear is a cup-shaped one, but the present invention can also be applied when a flexible external gear of another shape, such as a silk hat-shape, is used.

The torque sensors can be disposed on parts of the flexible external gear aside from the diaphragm. Also, the torque sensors can be disposed on the rigid internal gear instead of on the flexible external gear.

In addition, aside from contact-type strain gauges, it is possible to use magnetostriction detection elements of non-contact type as the torque sensors.

On the other hand, in the above example the torque sensors and the rotational angle detector are assembled integrally. Even when a rotational angle detector is assembled separately, strain detecting elements such as strain gauges are arranged on the flexible external gear or the rigid internal gear. For example, it is possible to stick the strain detecting elements onto the diaphragm of the flexible external gear. Since stretching and compression is measured by the attached strain gauges in this case, a pair of strain gauges is attached with one gauge parallel with the radial direction of the diaphragm and the other gauge perpendicular to this gauge.

As described above, according to the rotational angle detection device and detection method for a wave gear device according to the present invention, the rotational angle of the wave generator is detected using signal components which are included in the output of the strain detection elements, which are synchronous with the rotational angle of a wave generator, and which vary in the form of two cycles of a sine wave in one rotation of the wave generator. Accordingly, in a driving mechanism constructed so that a wave gear device including this rotational angle detecting device is connected to a motor shaft, it is possible to detect the rotational angle of the motor shaft without providing a rotational angle detector for the motor shaft. It is therefore possible to realize a driving mechanism that is small, compact, and inexpensive.

The invention claimed is:

1. A rotational angle detecting device for a wave gear device that includes a ring-shaped rigid internal gear, a flexible external gear, and a wave generator with an elliptical shape for flexing the flexible external gear into an elliptical shape so as to partially engage the rigid internal gear and for moving engagement positions of the two gears in a circumferential direction, comprising:

first, second, and third strain detecting elements that are disposed at intervals of 120° in the circumferential direction on one of the rigid internal gear and the flexible external gear;

signal component extracting means that extracts, from outputs of the first to third strain detecting elements, signal components that appear as two cycles of a sine wave per rotation of the wave generator and are synchronous with a rotational angle of the wave generator;

signal processing means that generates two-phase sinusoidal signals that are 90° out of phase by carrying out a coordinate transformation on the three-phase sinusoidal signals that are 120° out of phase and have been extracted from the outputs of the first to third strain detecting elements; and angle calculating means that calculates a rotational angle of the wave generator based on the two-phase sinusoidal signals.

2. A rotational angle detecting device for a wave gear device according to claim 1, wherein the flexible external gear includes a cylindrical trunk part, a ring-shaped diaphragm that extends from one end of the cylindrical trunk part outward or inward in a radial direction, a thick boss that is continuous with one of an outer circumferential edge or an inner circumferential edge of the diaphragm, and external teeth formed on an outer circumferential surface portion of an opening end of the cylindrical trunk part.

3. A rotational angle detecting device for a wave gear device according to claim 2, wherein the first to third strain detecting elements are disposed on the flexible external gear.

4. A rotational angle detecting device for a wave gear device according to claim 1, wherein the first to third strain detecting elements respectively include a plurality of strain gauges.

5. A driving mechanism having a servo motor, a wave gear device, and the rotational angle detecting device as set forth in claim 1, wherein a motor shaft of the servo motor is fixed to a wave generator of the wave gear device, and a rotational angle of the motor shaft is detected by the rotational angle detecting device.

6. A rotational angle detecting method for detecting a rotational angle of a wave generator in a wave gear device having a ring-shaped rigid internal gear, a flexible external gear, and the wave generator with an elliptical shape for flexing the flexible external gear into an elliptical shape so as to partially engage the rigid internal gear and moving engagement positions of the two gears in a circumferential direction, comprising steps of:

disposing first to third strain detecting elements at intervals of 120° in the circumferential direction on one of the rigid internal gear and the flexible external gear;

extracting, from outputs of the first to third strain detecting elements, signal components that appear as two cycles of a sine wave per rotation of the wave generator and are synchronous with a rotational angle of the wave generator;

generating two-phase sinusoidal signals that are 90° out of phase by carrying out a coordinate transformation on the three-phase sinusoidal signals that are 120° out of phase and have been extracted from the outputs of the strain detecting elements; and calculating a rotational angle of the wave generator based on the two-phase sinusoidal signals.

* * * * *